United States Patent [19]
Cook et al.

[11] Patent Number: 5,437,714
[45] Date of Patent: Aug. 1, 1995

[54] SEMI-CONTINUOUS DEODORISER

[75] Inventors: Raymond Cook; Donald G. Sewell, both of York, England

[73] Assignee: Ebortec Limited, York, England

[21] Appl. No.: 331,731

[22] Filed: Oct. 31, 1994

[30] Foreign Application Priority Data

Nov. 4, 1993 [GB] United Kingdom ............... 9322788
Jul. 8, 1994 [GB] United Kingdom ............... 9413794

[51] Int. Cl.⁶ .................... B01D 19/00; C11B 11/00
[52] U.S. Cl. .............................. 96/201; 96/199; 96/203; 99/470; 99/472; 210/180; 261/148; 261/152; 554/175; 554/205
[58] Field of Search ............... 99/470, 472, 483; 55/222, 195, 208; 96/199, 201, 203, 204; 210/180; 261/113, 123, 124, 148, 152; 426/417, 484, 486-488, 492; 554/175, 184, 205

[56] References Cited

U.S. PATENT DOCUMENTS

| | | |
|---|---|---|
| 3,693,322 | 9/1972 | Lineberry et al. ............ 96/203 X |
| 3,933,953 | 1/1976 | Leva ............................. 261/148 |
| 3,999,966 | 12/1976 | Naylor ......................... 210/180 X |
| 4,072,482 | 2/1978 | Aoki et al. . |
| 4,089,880 | 5/1978 | Sullivan ....................... 554/205 |
| 5,241,092 | 8/1993 | Cheng et al. ................. 554/205 |
| 5,315,020 | 5/1994 | Cheng et al. ................. 554/175 |
| 5,374,751 | 12/1994 | Cheng et al. ................. 554/205 |

FOREIGN PATENT DOCUMENTS

520097A1 12/1992 European Pat. Off. .
963151 7/1964 United Kingdom .
2176713 1/1987 United Kingdom .

Primary Examiner—Timothy F. Simone
Attorney, Agent, or Firm—Nies, Kurz, Bergert & Tamburro

[57] ABSTRACT

A combined vertical column and shallow tray semicontinuous deodoriser for edible oils and fats and comprising a column (10) of discrete vessels and a deodorising vessel (13) disposed within or valve-connective thereto. In the operation of the device, heated oil from a vessel (12) is supplied to deodorising vessel (13) wherein it is circulated by steam injection at (33) through a lift tube (29), between a plurality of vertically separated self draining shallow trays (26, 27, 28). The entire oil content of deodorising vessel (13) is circulated therethrough approximately once a minute for a period in the region of eighteen minutes to strip free fatty acids and other volatile components from the oil by falling curtain and steam sparge techniques, and then the oil batch is discharged to a heat recovery vessel (14) and a cooling vessel (15) before product discharge.

10 Claims, 7 Drawing Sheets

SEMI-CONTINUOUS DEODORISER

THIS INVENTION relates to a semi-continuous deodoriser for edible oils and fats in which, by steam distillation, various impurities such as free fatty acids, aldehydes, ketones and other odiferous compounds, are stripped from the liquid in a process conducted at a temperature in the range of 150° to 270° C. and under vacuum conditions, typically 3 to 20 millibars absolute pressure. The distillation is assisted by live steam injected into the liquid.

In recent years the demand for higher quality and lower energy consumption has led to the development of more efficient continuous and semi-continuous deodorisers. Many systems are available but they generally fall into one of two categories, namely the vertical column type deodorisers and the horizontal type deodorisers. The latter have the advantage of shallow tray design which reduces the hydrostatic pressure present in the oil, allowing removal of the volatile impurities at lower temperatures and with less steam consumption.

Modern systems incorporate heating and cooling stages and some form of heat recovery stage. The operations are carried out sequentially in stacked vessels valve-connected to enable passage of the oil sequentially down the column. Vertical column systems of this kind give quicker and better drain down characteristics than horizontal system which allows the user to change feedstock in a shorter time.

In vertical column deodorisers the diameter of the deodorisation vessel is governed by the overall diameter of the column above and below, and this results in a depth of oil which is three or four times greater than that found in shallow tray horizontal deodorisers. The resulting hydrostatic pressure leads to a consumption of stripping steam which is approximately twice that required by shallow tray deodorisers.

It is an object of the present invention to provide a deodoriser for edible oils and fats, which combine the flexibility and low contamination of a vertical column semi-continuous deodoriser, with the efficiency and improved product quality of a shallow tray horizontal deodoriser.

According to the present invention there is provided a semi-continuous deodoriser for edible oils and fats, comprising a series of discrete vessels maintained under a common vacuum, valves connecting the vessels to enable passage of liquid sequentially along the series, the series comprising at least a liquid heating section, a liquid cooling section, and a deodorising vessel; valves connecting the deodorising section to the heating and cooling sections thus to receive heated liquid to be deodorised and to discharge deodorised liquid to be cooled; and means to pass stripping steam through the liquid in the deodorising vessel; characterised in that the deodorising vessel contains a plurality of self-draining shallow trays and includes means to circulate the liquid within the vessel between the trays; and in that means are provided for sparging steam through the liquid in the trays.

In one embodiment, the deodorising vessel is disposed within the column between a liquid heating vessel and a liquid cooling vessel.

In a further embodiment, the deodorising vessel is disposed outside the column but valve-connected separately to a liquid heating vessel and a liquid cooling vessel.

Embodiments of the invention will now be described, by way of example only, with reference to the accompanying drawings in which.

Figure 7:
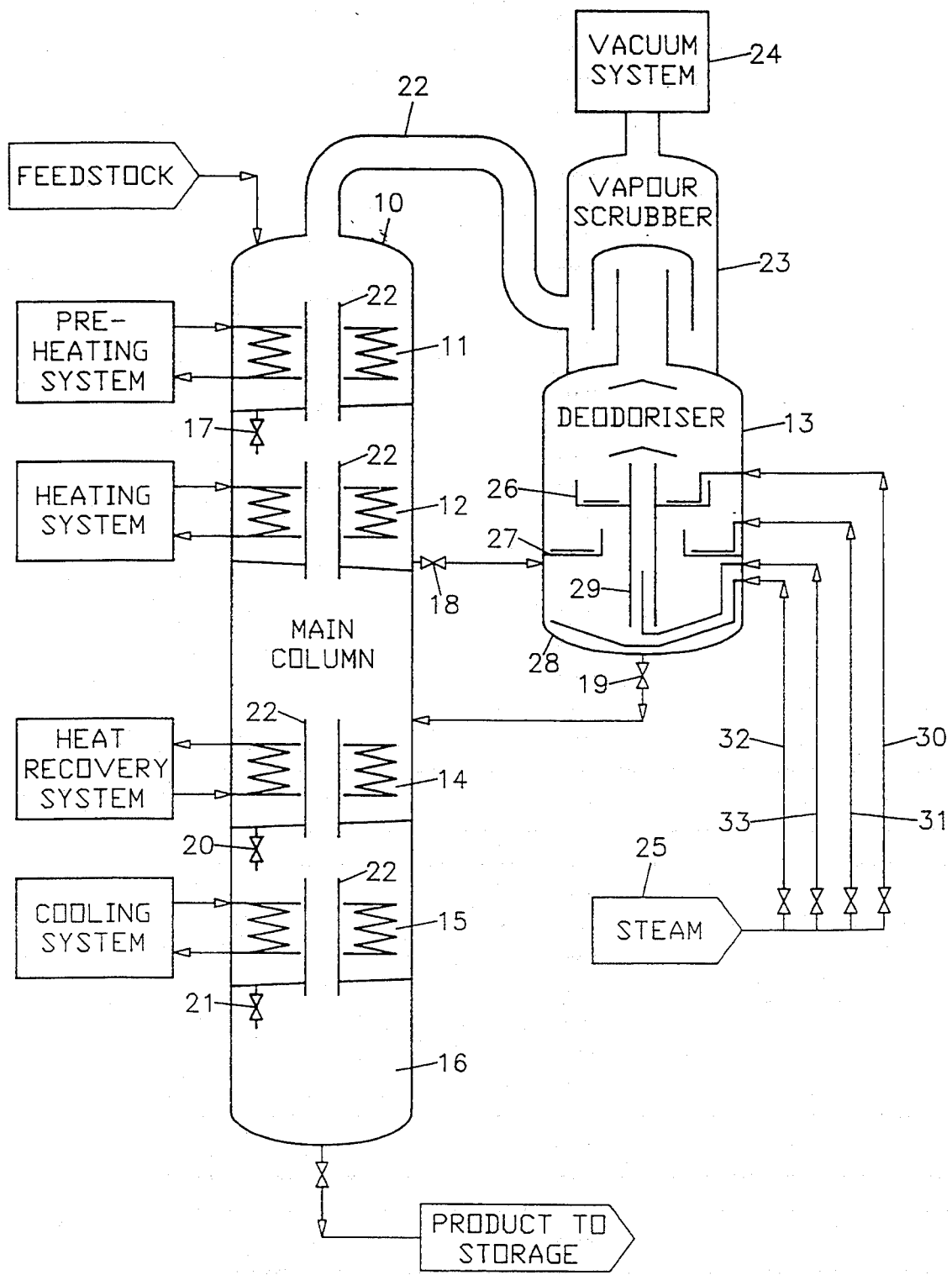

and FIG. 7 is a schematic flow diagram illustrating a deodoriser made in accordance with the invention with the deodorising vessel disposed outside the column.

Figure 1:
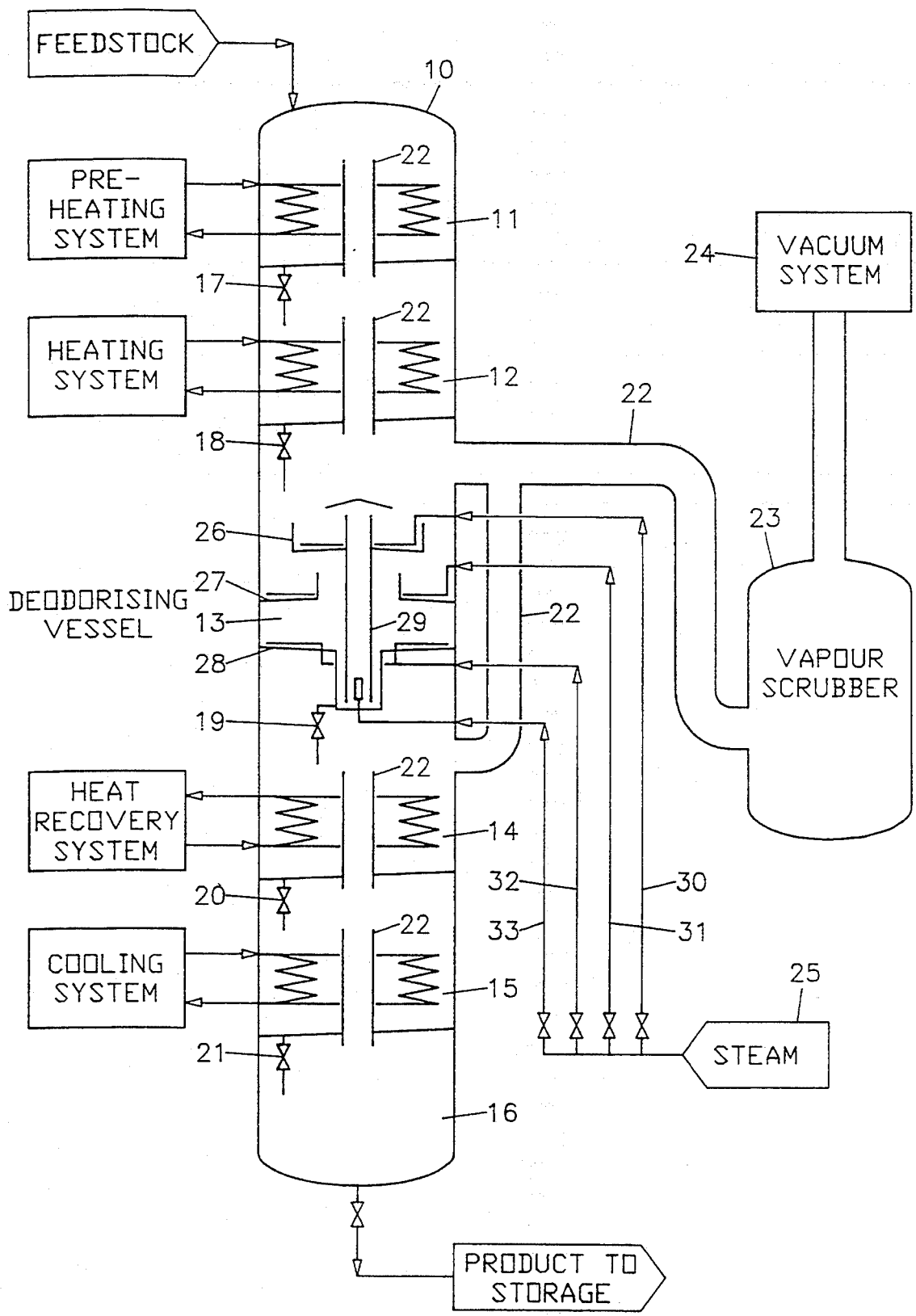
FIG. 1 is a schematic flow diagram illustrating a deodoriser made in accordance with the invention with the deodorising vessel disposed within the column.

Referring now to FIG. 1, a deodoriser made in accordance with the invention comprising a column 10 comprising an oil preheating vessel 11, an oil heating vessel 12, a deodorising vessel 13, a heat recovery vessel 14, an oil cooling vessel 15, and a discharge/storage vessel 16. Vessels 11 and 12 are valve-connected at 17. Vessels 12 and 13 are valve-connected at 18. Vessels 13 and 14 are valve-connected at 19. Vessels 14 and 15 are valve-connected at 20 and vessels 15 and 16 are valve-connected at 21.

Internal and external vapour ducts 22 enable pressure balance throughout the deodoriser. Connected to the external vapour duct 22 is a vapour scrubber 23 connected to a vacuum system 24. A supply of steam 25 is provided for the deodorising vessel 13.

In deodorising vessel 13 there are first and second elevated shallow trays 26 and 27 disposed in vertically spaced arrangement above the vessel base 28, the latter forming a further shallow tray. Centrally within the vessel 13 is disposed a lift tube and separate steam sparges 30, 31 and 32 are provided for the trays 26, 27 and 28. A steam injector 33 is also provided, the sparges 30 to 32 and injector 33 being valve-connected to the steam supply 25.

Figure 2:
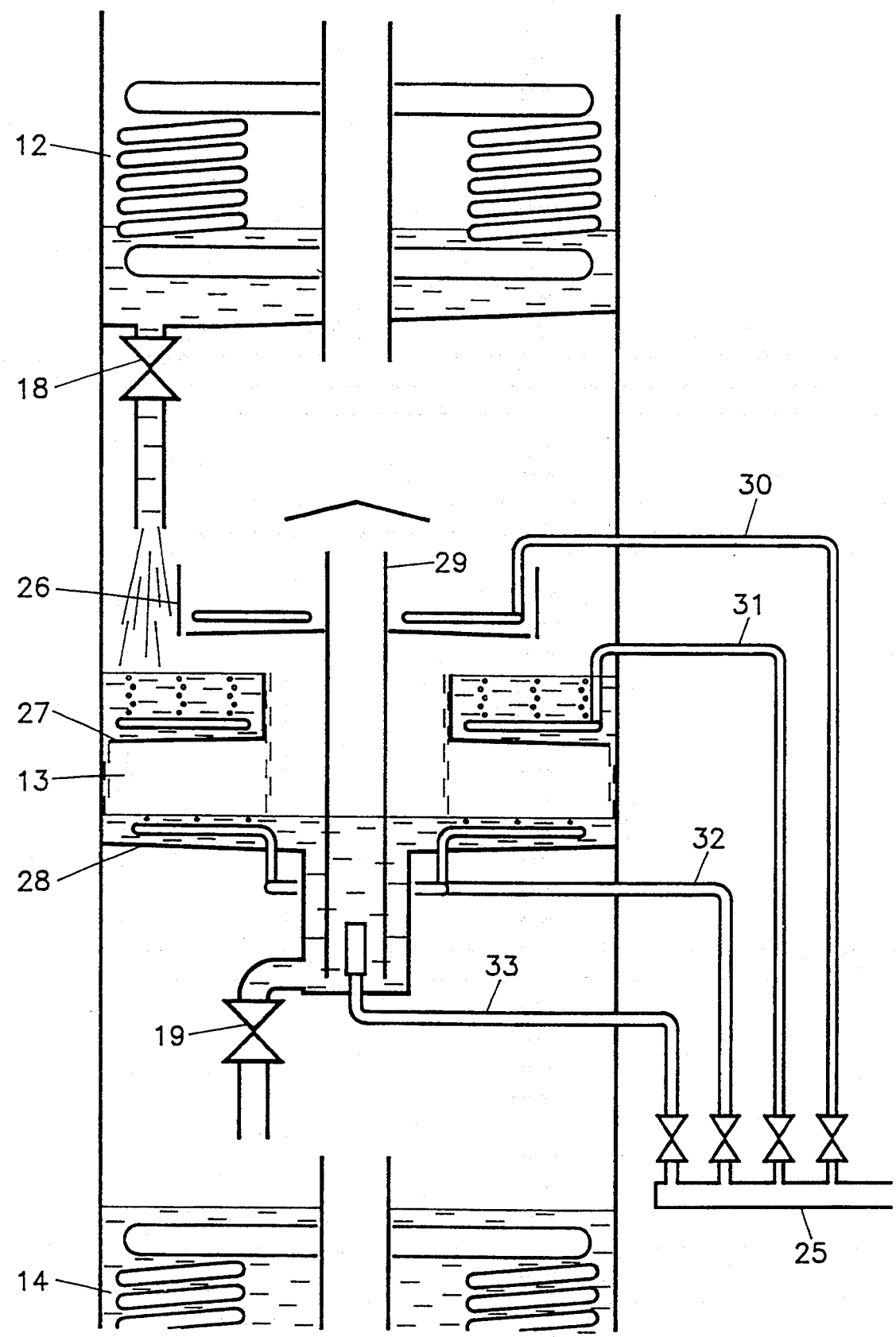
FIG. 2 is an enlarged view of the deodorising vessel forming part of the deodoriser operating to as receive oil from a heating vessel.

Referring now to FIG. 2, a deodorising cycle commences when a batch of heated oil is established in vessel 12, and valve 18 is opened to allow the oil to pass into the vessel 13.

Figure 3:
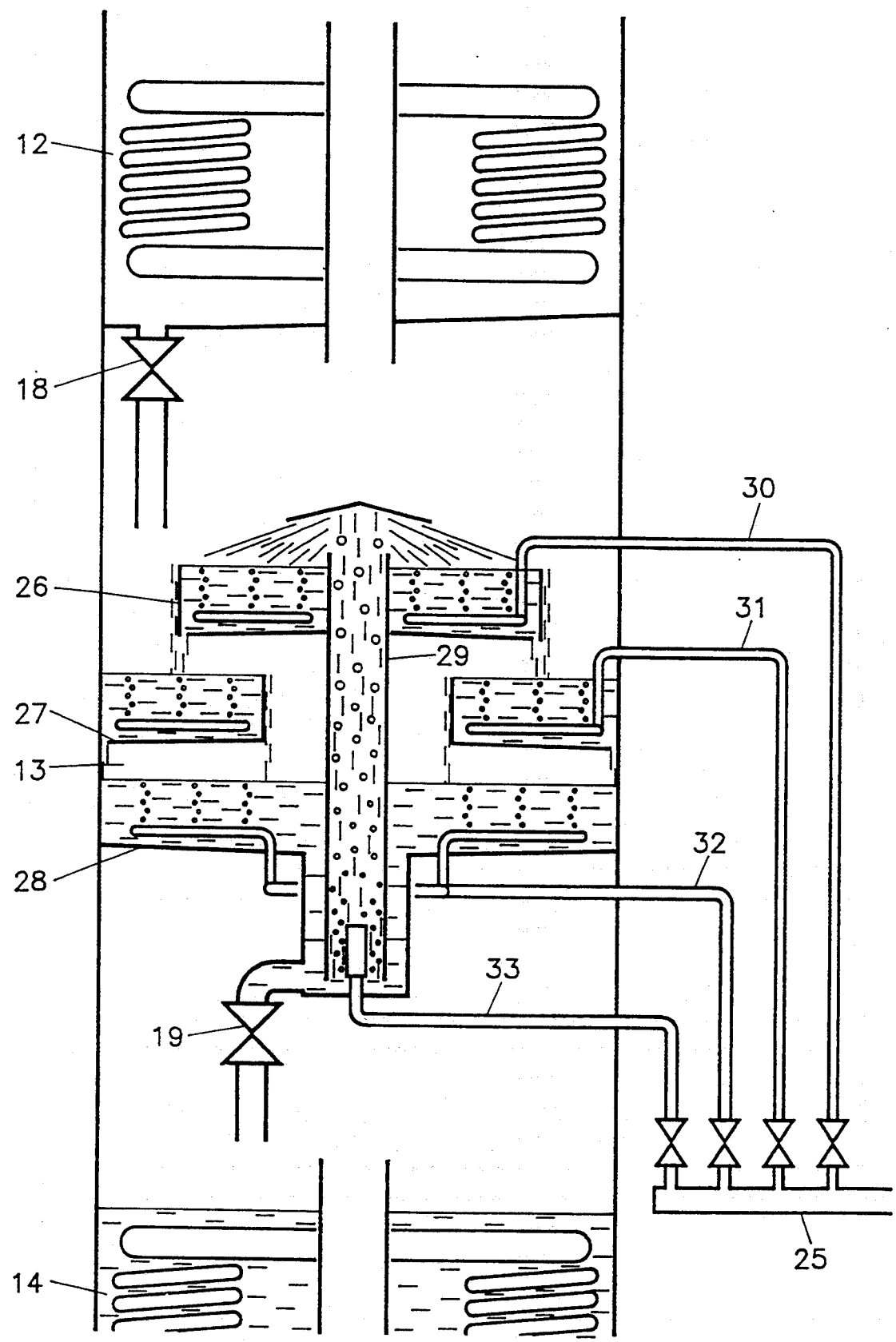
FIG. 3 is a similar view of the deodorising vessel operating in a deodorising mode.

When the batch of oil is established in vessel 13 valve 18 is closed and steam is introduced by injector 33 into the lower region of lift tube 29 thus causing the oil to flow upwardly through the tube and to cascade outwardly at the top into tray 26 and then sequentially into tray 27 and back to tray 28. FIG. 3 illustrates the deodorising mode when oil is being circulated between the trays by the steam injector 33 and lift tube 29. This produces a falling curtain of oil between the trays and since the bottom of each tray 26 and 27 is perforated, oil also drains downwardly to be replenished by recirculated oil from the tube 29.

During circulation of oil between the trays steam is supplied via sparges 30 to 32 into the lower regions of trays 26 to 28. The large surface area of oil provided by the falling overflow curtains and via the flows issuing from the drain holes in the upper two trays, enables substantially complete stripping of free fatty acids and certain other volatiles from 1% to 5% down to a figure in the region of 0.05%.

Ideally, at the commencement of the deodorising cycle for high free fatty acid content and for approximately 40% of its period, a greater proportion of the steam is supplied to the injector 33 with little or no steam being supplied to the sparges 30 to 32. This is to maximise the passage and circulation of oil through the vessel since the stripping of free fatty acids down to approximately 1% depends almost entirely upon the available surface area of the oil, and requires very little actual steam contact.

After this initial period the steam supply to injector 33 is reduced to a level sufficient only to maintain continued circulation, and the greater proportion of steam is supplied to sparges 30 to 32 thus to bubble upwardly through the oil in the trays to strip the other volatiles which are removed substantially by actual steam contact.

By valve-controlling the supplies of steam to the injector 33 and sparges 30 to 32 in this way the overall usage of steam can be minimised to ensure maximum operational efficiency with minimal energy consumption.

Figure 4:
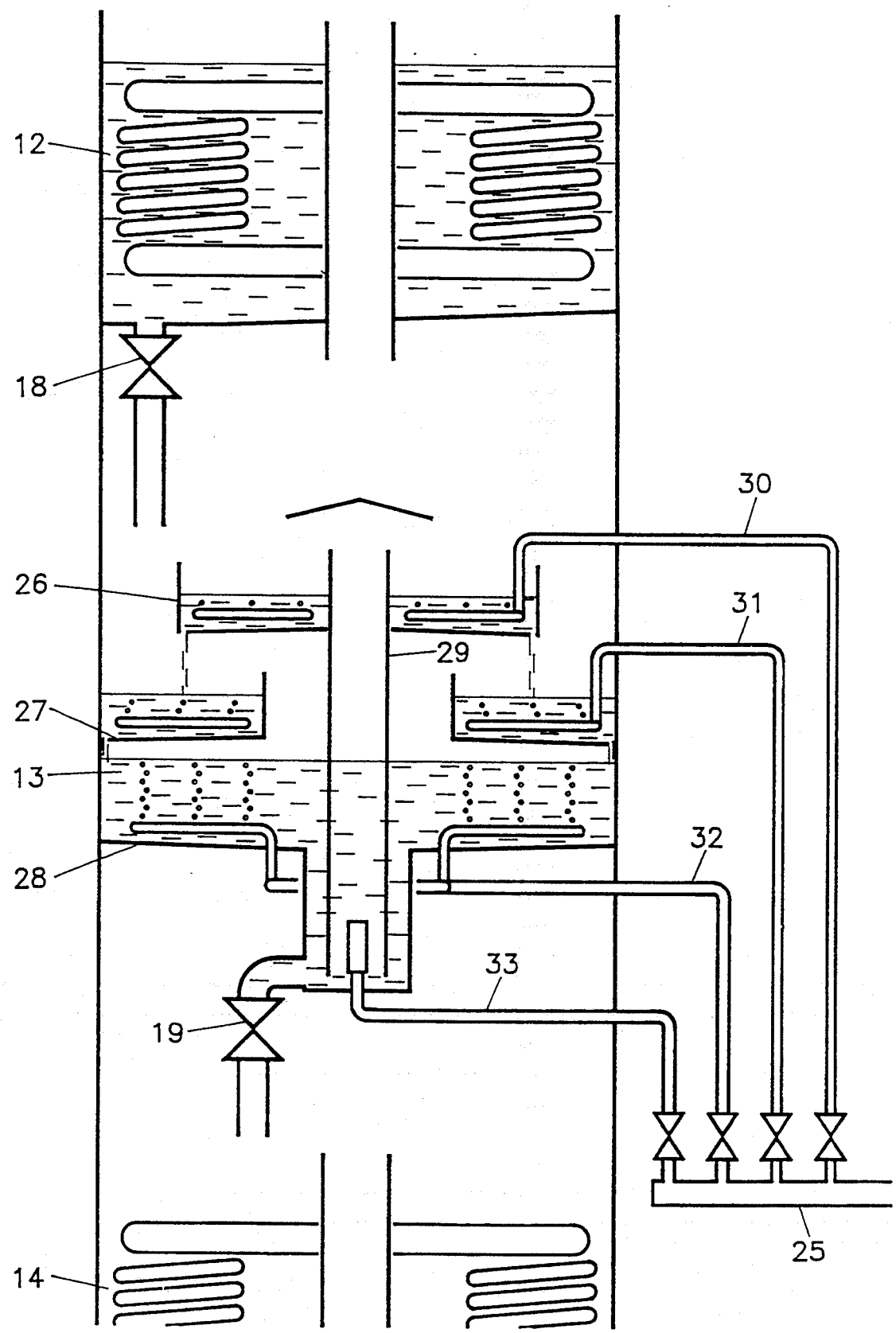
FIG. 4 is a similar view of the deodorising vessel operating in a draining mode.
Figure 5:
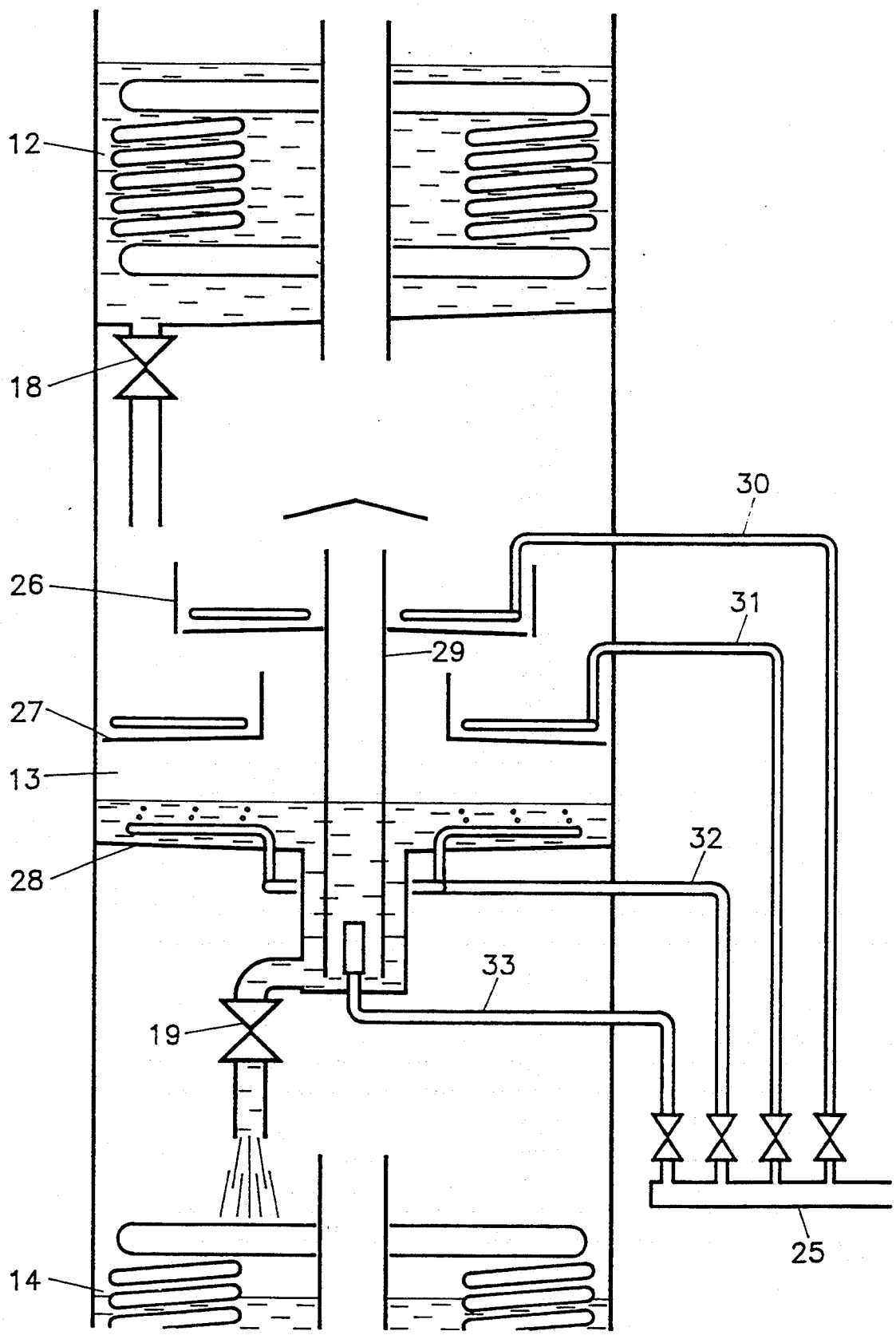
FIG. 5 is a similar view of the deodorising vessel discharging deodorised oil to a cooling vessel.

The deodorising cycle typically will last for between 10 and 20 minutes whereupon, as illustrated in FIG. 4, the steam supplied to injector 33 is arrested and the oil is permitted to drain freely into the lowest tray 28. Then, as shown in FIG. 5 valve 19 is opened to permit the deodorised oil to pass from the vessel 13 into the heat recovery vessel 14 and then sequentially to the cooling vessel 15 and the discharge vessel 16. The plant operates in a semi-continuous mode so that a supply of heated oil is available when required for transfer to the deodorising vessel.

It will be appreciated that the combined containment areas of the lowest tray 28 and the upper trays 26 and 27, are considerably greater than the cross-sectional area of the column, thus allowing the oil depth in the deodorising cycle to be considerably reduced when compared with a conventional vertical column deodoriser. However, the reduced time taken to transfer oil from one vessel to another which is considerably less in vertical column deodorisers than in shallow tray deodorisers, is ensured whilst shallow tray technique is applied in the actual deodorising section. The perforations in the base of trays 26 and 27 are arranged such that each tray will drain rapidly in a period of between 45 and 60 seconds. The lift pump is adapted to deliver oil at approximately twice the drainage rate which maintains the cascade effect producing a curtain of falling oil. The considerable total surface area of the curtain is flowing countercurrent with the steam issuing from the sparge 32 thus providing rapid transfer of volatiles from the liquid to the gaseous phase. Complete circulation of the entire body of oil in a particular batch will be effected within the deodorising vessel approximately once per minute.

Figure 6:
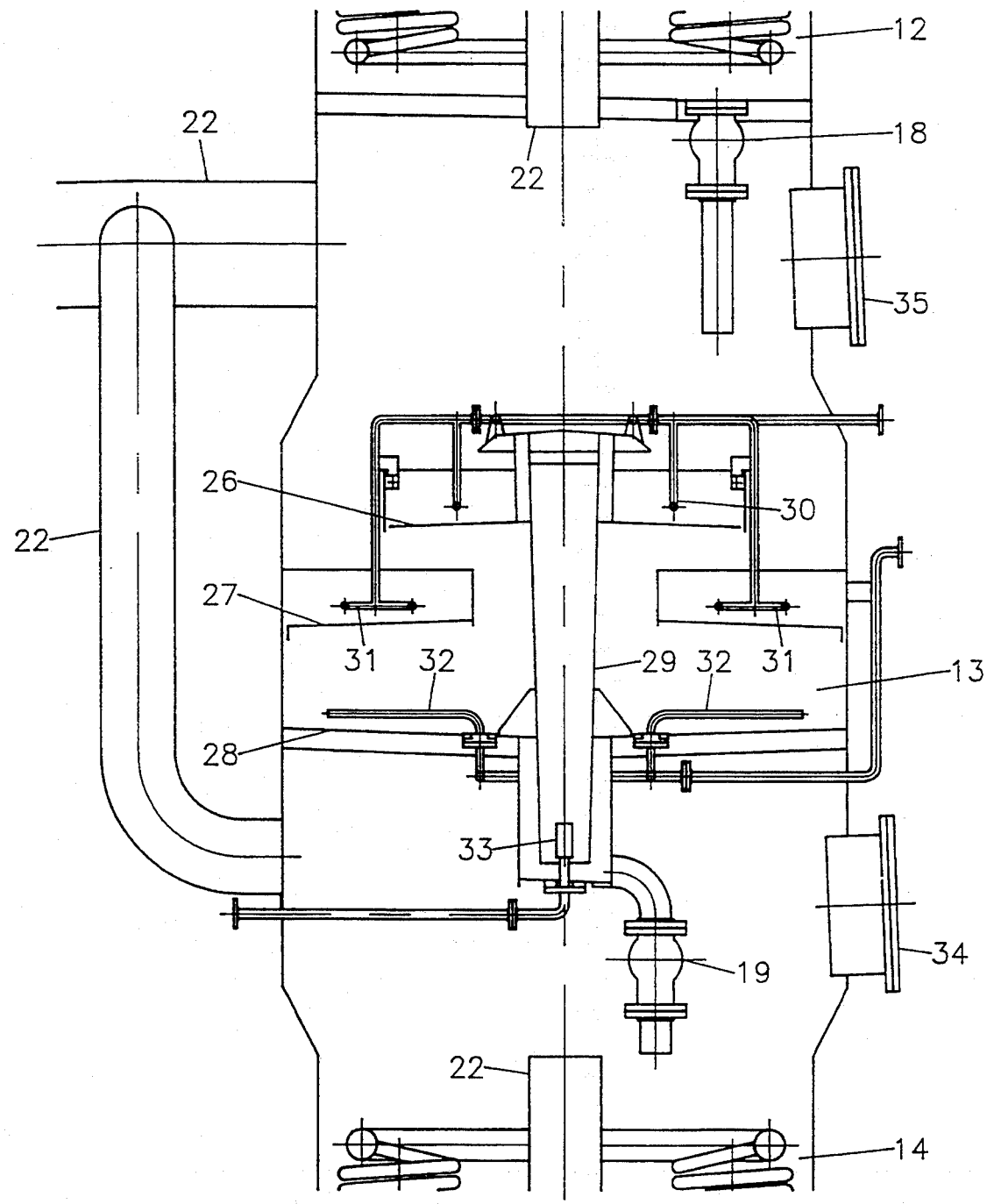
FIG. 6 illustrates a deodorising vessel in greater detail.

Referring now to FIG. 6, this is an example of a design with the deodorising tray 13 disposed within the column. This arrangement is preferable for minimal manufacturing cost.

Illustrated is an arrangement of sparge pipes 30 to 32 and a steam injector pipe 33 which are flange connected within the system for ease of removal for maintenance and/or replacement. A manhole 34 near the base of the deodorising vessel 13 and another manhole 35 above the latter enable access to the sparge and injector pipes to permit their removal, without the need for cutting any part of the vessel.

Referring now to FIG. 7, this schematically illustrates a deodoriser with the deodorising vessel disposed outside the column. In this embodiment the deodoriser vessel 13 is valve-connected at 18 to the heating vessel 12 and at 19 to the heat recovery vessel 13. Disposed above the deodorising vessel and connected to the external vapour duct 22 is the vapour scrubber 23.

It is not intended to limit the invention to the above examples only, many variations being possible without departing from the scope of the appended claims.

We claim:

1. A semi-continuous deodoriser for edible oils and fats, comprising a series of discrete vessels maintained under a common vacuum, valves connecting the vessels to enable passage of liquid sequentially along the series, the series comprising at least a liquid heating section, a liquid cooling section, and a deodorising vessel; valves connecting the deodorising section to the heating and cooling sections thus to receive heated liquid to be deodorised and to discharge deodorised liquid to be cooled; and means to pass stripping steam through the liquid in the deodorising vessel; characterised in that the deodorising vessel contains a plurality of self draining shallow trays and includes means to circulate the liquid within the vessel between the trays; and in that means are provided for sparging steam through the liquid in the trays.

2. A semi-continuous deodoriser according to claim 1, wherein the deodorising vessel is disposed within a column between a liquid heating vessel and a liquid cooling vessel.

3. A semi-continuous deodoriser according to claim 1, wherein the deodorising vessel is disposed outside a column containing a liquid heating vessel and a liquid cooling vessel, but valve-connected thereto.

4. A semi-continuous deodoriser according to claim 1, in which the means for circulating the liquid between the trays comprises a lift tube disposed upright within the deodorising vessel and including a steam injector arranged to force liquid upwardly through the lift tube, the upper end of the latter being disposed above the shallow trays such that the liquid may fall into the latter.

5. A semi-continuous deodoriser according to claim 4, wherein each shallow tray is at an elevated position and has a perforated base to enable drainage of liquid downwardly through the deodorising vessel.

6. A semi-continuous deodoriser according to claim 1, in which the deodorising vessel contains two elevated self draining shallow trays, one above the other, and mounted in the vessel such that a curtain of liquid overflowing from the upper of the two elevated trays passes downwardly to fill the lower of the two elevated trays and wherein a curtain of liquid overflowing from the lower of the two elevated trays passes downwardly into the base of the vessel, each of said elevated shallow trays having a perforated base for drainage of liquid therefrom.

7. A semi-continuous deodoriser according to claim 1, including at least one steam sparge disposed in the lower region of each shallow tray.

8. A semi-continuous deodoriser according to claim 4, including at least one steam sparge disposed in the lower region of each shallow tray and including means for the separate control of the flow of steam to the steam sparges and to the steam injector and adapted to supply a greater proportion of the steam to the steam injector then to the sparges for an initial period of a deodorising cycle, and thereafter to supply a greater proportion of steam to the sparges than to the steam injector for a subsequent period of the deodorising cycle.

9. A semi-continuous deodoriser according to claim 1, wherein to the sparges and the injector pipes transferring steam into the deodorising vessel are mounted in the vessel to be removable therefrom without cutting any part of the vessel.

10. A semi-continuous deodoriser according to claim 9, wherein the sparge and injector pipes are flange mounted within the deodorising vessel to enable easy removal therefrom for maintenance.

* * * * *